United States Patent [19]

Goldstein

[11] 4,274,045

[45] Jun. 16, 1981

[54] POWER SUPPLY AND CONTROL CIRCUIT FOR SERIES CONNECTED CONTROLLER

[76] Inventor: Richard Goldstein, 1671 E. Mission Hills Rd., Northbrook, Ill. 60062

[21] Appl. No.: 28,052

[22] Filed: Apr. 9, 1979

[51] Int. Cl.³ .......................................... H05B 37/02
[52] U.S. Cl. .................................. 323/319; 315/240; 315/360
[58] Field of Search ............... 307/252 UA; 315/240, 315/360; 323/18, 19, 22 SC, 24, 34, 38

[56] References Cited

U.S. PATENT DOCUMENTS

| | | | |
|---|---|---|---|
| 3,904,952 | 9/1975 | Evalds | 323/24 |
| 3,940,634 | 2/1976 | Grogan | 323/18 X |
| 3,940,660 | 2/1976 | Edwards | 315/360 |
| 4,130,767 | 12/1978 | Okuhara et al. | 323/24 X |
| 4,158,150 | 6/1979 | Dever | 323/18 X |

Primary Examiner—A. D. Pellinen

[57] ABSTRACT

A control circuit for a power switch like a triac to be connected in series with a load device, at a situs where only one AC power conductor and a conductor extending to the load device is available, is energized from a DC power supply energized from these conductors. The power supply includes at least one rectifier connected in series with a capacitor, the terminals of which capacitor constitute the DC output terminal of the DC power supply, an impedance of much greater resistance than that of the load device and through which the capacitor is charged when the triac is in its non-conductive mode, and a normally non-conductive triggerable low impedance threshold device shunting the high impedance and triggered momentarily into conduction as the applied AC voltage goes through zero when the triac is to be in its conductive mode. Current flow through this threshold device triggers the power switch into conduction a short interval after passage of this voltage through zero. The capacitor charges only during each such short interval it takes to initiate conduction of the power switch.

17 Claims, 6 Drawing Figures

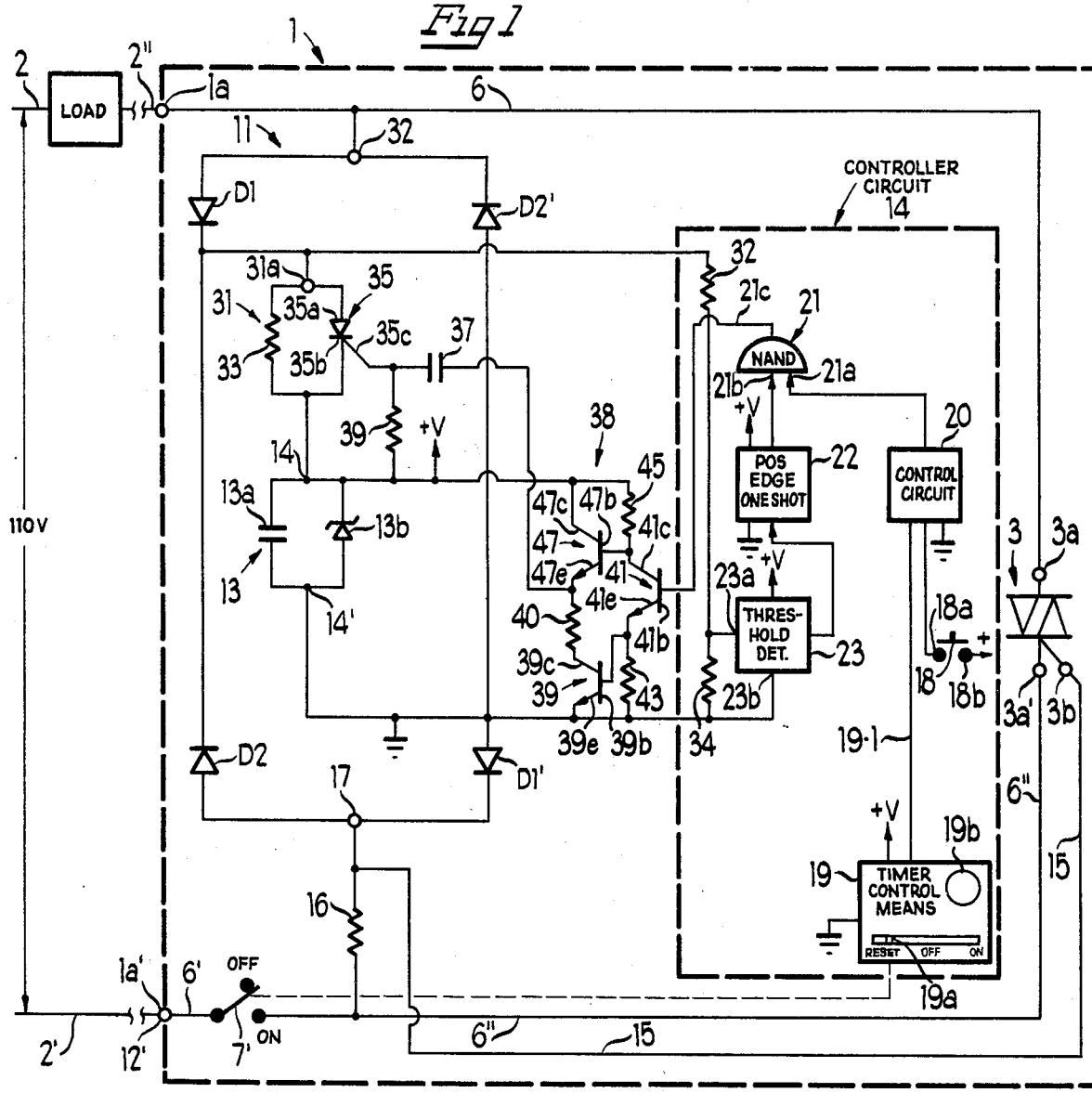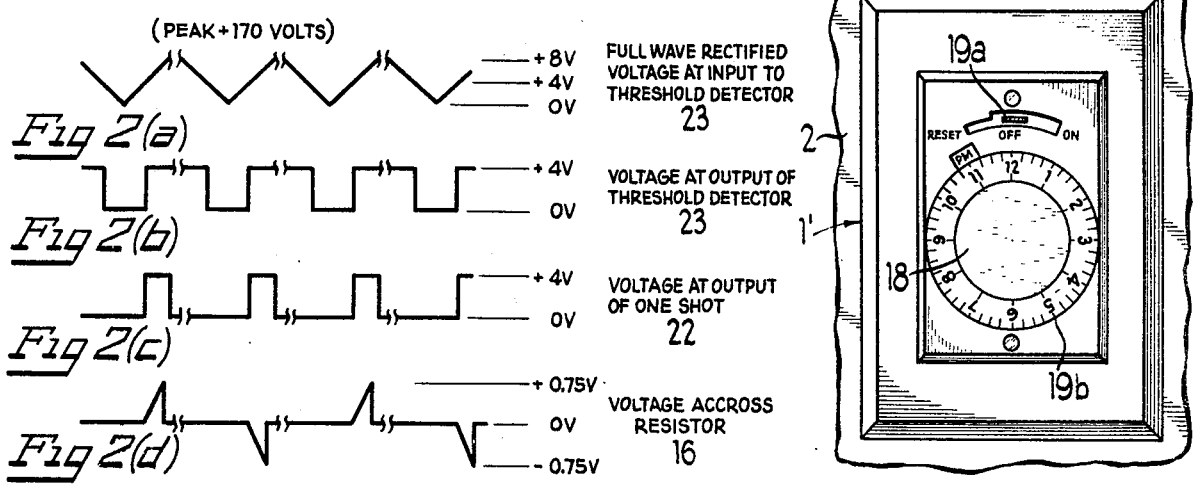

POWER SUPPLY AND CONTROL CIRCUIT FOR SERIES CONNECTED CONTROLLER

BACKGROUND OF INVENTION

It is often desirable that a controller and the power switching means it controls be combined in a two terminal device intended for connection in series with a source of electrical energy and the load being switched. A timer control for a lighting load, for example, so designed could be substituted for the ordinary wall switch which normally controls the light, even if both sides of the power line are not available in the switch box.

Such an arrangement, however, requires that the power supply for the controller receive its energy through the load during both states of the power switch; that is, when it is open or closed. An additional practical requirement of such a system is that the energy consumed by the controller be very small in comparison to the energy consumed by the load. This latter requirement is easily met by modern controllers, even for controlling loads as small as a few watts. Thus, the minute amount of power required by the controller can be supplied through the load when the power switch is open, the current then passing through the load being so small in comparison to the full load current that the load, for all practical purposes, is de-energized. When the power switch is closed, however, energy for the controller must be obtained in a different manner.

The prior art teaches two methods for deriving a minute amount of power for the controller when such a power switch is closed, one method being shown in U.S. Pat. No. 3,491,249 to Rabinow, and the other by U.S. Pat. No. 3,940,660 to Edwards. In the method shown in U.S. Pat. No. 3,491,249 to Rabinow a constant low impedance is placed in series with the load, so that the voltage drop across this impedance is only a small fraction of the voltage of the power source. Rabinow's controller is an electric clock mechanism. He achieves the low impedance simply by switching the load from a high impedance low current clock coil to a low impedance high current winding on the clock coil for which the full-load current produces only a small voltage drop but still supplies sufficient power at the relatively high load current to keep the clock running.

In U.S. Pat. No. 3,940,660 to Edwards (and also in later patents of others) there is disclosed a time division method of sharing power between the load and the controller when the power switch is closed. This method involves delivering energy to the controller power supply in the extremely short intervals during which a threshold type power switch like a triac is non-conductive at the beginning of each half cycle of the applied AC voltage.

If the method of Rabinow were to be applied to the power supply for an electronic controller rather than a clock mechanism controller, a transformer could be substituted for the clock motor coil. However, such a transformer would be bulky and costly in comparison to the method of this invention. Other series-connected low impedance devices could be used instead of a transformer, however, but these also have their drawbacks. The series impedance could, for instance, be a small saturable core inductor but this would also be bulky and expensive in comparison to this invention. Back-to-back diodes could also be used. These would have the advantage of causing a relatively constant voltage drop. However, to obtain voltage high enough to power a typical electronic circuit might require stacking two or more pairs of back-to-back diodes or the use of back-to-back zener diodes. Such a system would be much less bulky than a transformer or saturable inductor. However, it has the serious drawback that the power consumed by the diodes is dependent upon the load current. If a wide range of loads is to be switched, such as lamp loads from 25 to 600 watts, the current range for a 120 VAC supply would be from about 0.2 to 5.0 amperes. If a 3.0 volt drop across the diodes were to be required for the electronic controller power supply, the power dissipation of the diodes could rise to 15 watts. This would preclude the design of a controller of small enough size to operate in a wall switch box because of excessive temperature rise. The situation would be even worse if the series impedance were purely resistive.

While the just described problems are avoided by the energy time sharing system described in the Edwards patent, this system has significant disadvantages. Thus, this time sharing system supplies the power to the controller power supply through a resistance (R1 in FIG. 2 of the Edwards patent) which is continuously connected to the AC power source through the load. When the load is switched "off", the power supply consisting of diodes (D1, D2, Z1, Z2) and capacitors (C1 and C2) and resistance R1 are in series with the AC power source and the load. Since the load is a low impedance compared to that of the resistance R1, resistance R1 must have a wattage rating nearly equivalent to the power it would dissipate if it were connected directly across the AC power source. Therefore, the value of resistance R1 should be made as high as possible when the load is switched "off", consistant with the small amount of power actually required by the controller circuitry. If the full AC power source voltage were always available, the resistance R1 could be made so high as to reduce its power dissipation to well under one watt. However, when the load is to be switched "on", the voltage for the control power supply is available only during those brief time-share instances when the load switch (in this case a triac) is non-conducting.

If the triac switch is to be non-conducting for a portion of each cycle or half cycle of the AC power source, then the triggering of the triac must be delayed from the moment of each zero crossing until the supply voltage has risen to a value sufficient to supply the required energy through resistance R1. However, it is very desirable that the voltage reached by the supply before the triac is switched on be as low as possible so as to deliver the maximum amount of power to the load, and even more important, to prevent the production of radio interference noise caused by the rapid switching characteristics of the triac. Studies have shown that switching incandescent lamps in a 120 volt AC circuit by means of a triac or the like requires the use of a filter network to suppress radio interference, unless the triac is switched very close to the "zero crossing" of the applied AC voltage, that is, prior to the voltage having increased (positively or negatively from zero) to more than about 5 volts. To maintain switching near zero crossing and still supply enough power through resistance R1 for the control power supply requires that resistance R1 should have as low a resistance as possible consistant with supplying the energy required by the control circuitry. Thus, there are contradictory requirements for the value of resistance R1 between times when the load is to be switched "off", where it is desirable to have resistance R1 a very high value, and when the load is to be switched "on", where it is desirable to have resistance R1 a very low or even zero value. The compromise required between these two desirable values of resistance R1 has been found to preclude the use of a low wattage resistor for resistance R1 and thus the time sharing system disclosed in the Edwards patent has the same excessive power dissipation problem of the series impedance method described previously. If a compromise with delivering full power to the load is made so that resistance R1 can have a substantially high value, then the supply voltage must rise to a value in excess of 50 volts and perhaps to as high as 100 volts, before the triac is triggered. In this case, however, a noise filter will be required to suppress radio interference and the cost and bulk will be considerably increased.

A second disadvantage of the time sharing system described is the manner in which both positive and negative gate current for triggering the triac is obtained. (It is most desirable to trigger a triac with a positive gate current for one half cycle and a negative gate current on the opposite half-cycle, since this requires the lowest value of gate current to assure triggering and the performance is thus most easily guaranteed by the manufacturer). In the system disclosed in the Edwards patent, to provide for dual polarity gate current, two control power supplies of opposite polarity must be supplied, thereby doubling the cost of the power supply. Also, since the gate current must be switched by logic circuits, discrete transistors or other control devices are required to switch the gate current, such as an NPN transistor (Q1) and PNP transistor (Q2). Since these transistors are reverse biased between emitter and base for one half cycle by the peak source voltage, they must be protected by the addition of diodes (D3 and D4). The need to use all these components considerably increases the cost and bulk of the controller as compared to a circuit like that of the present invention. However, the most serious disadvantage is that the value of resistance R1 required to prevent excessive power dissipation when the load is switched off requires delaying the triac trigger for the switched on state until the AC power source reaches a relatively high value, thus requiring the addition of a filter to eliminate radio interference noise.

The present invention avoids these disadvantages and makes possible the design of an extremely compact, low cost controller for a series connected load in which the total power dissipation is essentially that of the triac switch and which also provides near zero crossing switching in a manner that a radio interference filter is not needed.

SUMMARY OF THE INVENTION

In accordance with one of the features of the invention, a DC power supply and control circuit is provided for controlling the flow of current through a power switch like a triac connected in series with a load device and wherein the power supply circuit is energized in a time-sharing manner when the circuit is in a triac conducting mode of operation, but without the above described disadvantages of the prior power supply circuits energized in this manner. In the present invention, there is connected in series between the AC input terminals of the circuit at least one rectifier, a parallel branch impedance circuit and an energy storage means, like a capacitor. The preferred circuit, however, places a full wave rectifier circuit between this series circuit and the circuit AC input terminals. In either event, only DC flows through this series circuit. The parallel branch impedance circuit has one high impedance branch which may comprise a resistor of such a high value that it absorbs a relatively small amount of power in comparison to the normal load power. For example, this resistor preferably absorbs only a small fraction of a watt of power when the triac (or other power switch) is to be continuously non-conductive. The capacitor charges through this high impedance branch when the power switch is continuously non-conductive.

The parallel branch impedance circuit has a low impedance branch in parallel with the high impedance branch, which low impedance branch is substantially non-conductive or has a very high impedance when the power switch is to be continuously non-conductive. It is rendered conductive to shunt the high impedance branch with a very small or almost zero resistance when the switch is to be operated in a conductive mode, so that the energy storage capacitor can be quickly charged from the applied AC voltage to a useful voltage for DC power supply purposes (such as a voltage of preferably from about 4 to 5 volts) in a few degrees after the applied AC voltage passes through zero, when it has a similar very low amplitude, where little or no radio interference noise is generated when the power switch is operated to its conducting state. This normally non-conductive shunting impedance branch is most desirably the anode-cathode circuit of a triggerable threshold device, like a SCR device. Such a device, sometimes referred to as a triggerable threshold device, is one which like a triac can be triggered into conduction by application of a relatively short, small, gate current, such conduction continuing for the balance of the half cycle involved, until the current flow through the anode and cathode (i.e. load) terminals thereof falls below a given low holding current level. The gate current is preferably, but not necessarily, obtained by discharging a capacitor through the gate terminal thereof after the capacitor is charged to a given small voltage (like about 4 to 5 volts) during the preceding half cycle. The conduction of the SCR device causes the energy storing capacitor to become initially quickly charged by the applied AC voltage when it has not exceeded the desired voltage to which the energy storing capacitor is to be charged. The voltage across the capacitor is preferably fixed or limited to such voltage level by placing a zener diode across this capacitor with its terminals oriented so as to be normally in a current blocking direction, except when the voltage across the capacitor exceeds the desired voltage level. When the power switch is rendered conductive, the voltage to which the capacitor can be charged is also limited by the fact that each half cycle the power switch is usually triggered into conduction at or near the point where the applied AC voltage reaches the voltage to which the energy storing capacitor is to be charged. As the power switch becomes conductive, it bypasses substantially all current from the DC power supply circuit described, whereupon the resulting loss of holding current causes an impedance shunting SCR device to be non-conductive. Thus, charging current can flow to the energy storage capacitor when the power switch is operating either in its conductive or non-conductive mode, in the latter case at any time through the relatively high impedance branch of the parallel branch impedance circuit, and in the former case during the short period following each passage of the applied AC voltage through zero and prior to the retriggering of the power switch into conduction.

In accordance with another feature of the invention which substantially simplifies and reduces the cost of the power supply and control circuit, the control terminal of a triac or other power switch, which is preferably a threshold-type device, and one of the load terminals thereof are connected across a trigger voltage developing impedance so that current flows in opposite directions through this impedance during successive half cycles of the applied AC voltage, to develop ideal voltages of alternating polarity for most efficient triggering of the triac or other threshold type power switch. This impedance is a relatively low impedance across which appears only a very small voltage incapable of triggering the power switch when the aforementioned impedance shunting SCR device is non-conductive. When the SCR device is triggered into conduction each half cycle when it is desired to operate the power switch in a conductive mode, a larger voltage is developed across the trigger voltage developing impedance by the larger current flowing therethrough, which voltage triggers the power switch into conduction.

In accordance with a further feature of the invention, the aforementioned capacitor which discharges through the SCR device gate terminal when it is desired to render the power switch conductive is charged and discharged through a preferably transistorized switching circuit which controls the charge and discharge of the latter capacitor. This switching circuit, in turn, is controlled by signal pulses synchronized to the zero crossing times of the applied AC voltage and under control of enabling signals developed by operation of a manually operable power on-off switch or other control means which, like all of the other control circuits of the power control circuit involved, is energized from the voltage developed across the aforementioned energy storage capacitor during the periods when the power switch is non-conductive.

The component cost of a power supply and control circuit having all of the features of the invention described above is very nearly the same total cost that would be required for a conventional triac trigger circuit and a separate low voltage controller power supply operating directly from the AC power source, the only additional components being the rectifiers used to form a full wave rectifier circuit.

The above described and other feature and advantages of the invention will become apparent upon making reference to the specification to follow, the drawings and the claims.

DESCRIPTION OF DRAWINGS

FIG. 1 is a schematic diagram of the power supply and control circuit of the invention, the control circuit including a manual operable switch and timer for effecting the desired operation of a triac forming part of the control circuit;

FIGS. 2(a), (b), (c) and (d) show respectively voltage wave forms drawn with reference to a common time base and appearing at different points in the circuit of FIG. 1 when the triac is to be rendered conductive; and FIG. 3 is an elevational view of a wall-mounted control unit which includes manually operable controls for the manually operable switch and timer shown therein.

DESCRIPTION OF EXEMPLARY EMBODIMENT OF THE INVENTION

Refer now to FIG. 1 which illustrates my preferred power supply and control circuit of the invention generally indicated by reference numeral 1. This circuit may be incorporated in an enclosure assembly 1' shown in FIG. 3 mounted in an opening in a wall 2. This wall opening may be a conventional wall switch station opening in a residence, office building or the like, wherein the manually operable toggle arm operated switch unit normally mounted therein has been replaced by the enclosure assembly 1' with the power supply and control circuit of the invention contained therein. As is conventional, such a wall switch station normally includes a pair of conductors 2'-2", conductor 2' shown extending to one AC power line and conductor 2" extending to one terminal of a load device or circuit, like one or more ceiling lights or wall outlet sockets, whose opposite terminal extends to a conductor 2 connector to another AC power line. These AC power lines commonly have applied thereto 110 volt AC commercial power.

The conventional toggle arm operated switch normally interconnecting the conductors 2" and 2' is replaced by a solid state power switch, preferably a threshold device like a triac 3 through which AC can flow. The power supply and control circuit 1 has input terminals 1a and 1a' respectively connected to the conductors 2" and 2'. A conductor 6 extends between the terminal 1a and a load or main terminal 3a of the triac 3. A conductor 6' extends between the AC input terminal 1a' and one terminal of an on-off switch 7 whose other terminal is connected by conductor 6" to the other load terminal 3a' of the triac 3. When the triac is to be in a conducting mode, a triggering signal is fed to the control or gate terminal 3b of the triac each half cycle of the applied AC voltage, to initiate current conduction a few degrees after the applied AC voltage passes through zero and for the balance of the half cycle involved. As previously indicated, in this short time interval between the instant the applied AC voltage passes through zero and the instant when the current actually flows between the triac load terminal 3a-3a', a power supply and triac triggering circuit generally indicated by reference numeral 11 connected in parallel with the triac load terminals 3a-3a' receives power from the AC input terminals 1a-1a' for both energizing an energy storage means 13 and operating a trigger signal generating circuit including circuit elements to be described.

The energy storage means 13 may comprise a chargeable battery or, as illustrated, a capacitor 13a across which is connected a zener diode 13b which limits the DC voltage across the capacitor terminals 14-14' to a given desired value, for example, +4 volts. Terminal 14' will be considered to be at reference or chassis ground, and terminal 14 will be considered a positive "+V" terminal. The various circuits which are to effect control functions to be described are shown in block form with "+V" and ground terminal connections thereto for energizing these circuits.

The control terminal 3b of the triac 3 is connected by a conductor 15 to a trigger signal developing impedance shown in the form of a resistor 16, connected between conductor 6" leading through switch 7 to AC input terminal 1a', and a terminal 17 of a full wave rectifier circuit to be described. When the triac is to be operated in a conducting mode, short voltage pulses of alternating polarity appear across the resistor 16 shortly after the beginning of successive half cycles of the applied AC voltage, which pulses initiate conduction of the triac 3 a few degrees after the applied AC voltage passes through zero. As indicated, once conduction is initiated each half cycle between the triac load terminals 3a–3′, conduction therebetween continues for the remainder of the half cycle involved until the current flow drops below a given holding current level. The triac then becomes non-conductive until triggered into a conductive state by another trigger signal fed to control terminal 3b once again during the next half cycle involved.

The development or disappearance of triac triggering signals across resistor 16 is determined by a controller circuit 14 which may include a manual pushbutton 18 accessible on the front of the enclosure assembly 1′ (FIG. 2) and/or other control means, such as a timer 19. Timer 19 as illustrated in FIG. 3 includes a control arm 19a movable selectively to RESET, TIMER-OFF and TIMER-ON positions. When the control arm 19a is in a RESET position, the on-off switch 7 is operated to its circuit opening condition, and when the control arm 19a is in either its TIMER-OFF or TIMER-ON position, the on-off switch 7 is closed. When the control arm 19a is in its TIMER-ON position, the timer 19 generates a signal on an output line 19-1 which signal effects the development or disappearance of trigger signals across the resistor 16. When the control 19a is in a TIMER-OFF position, the development or disappearance of trigger signals across the resistor 16 is under control of the manually operable pushbutton 18. The programming of the timer (that is the determination of the particular time intervals during which the timer 19 generates a signal which develops or causes the disappearance of trigger signals across the resistor 16) may be achieved by rotation of a rotatable dial 19b and the operation of the manual pushbutton 18 or similar control after the control arm 19a is moved from its RESET position. While the present invention has nothing to do with the details of the timer 19, a timer 19 like that just described is the subject matter of co-pending application Ser. No. 22,463 entitled TIMER AND POWER CONTROL SYSTEM, filed Mar. 26, 1979.

In any event, whenever the condition of the triac is to be modified, either from a conductive to a non-conductive state, or from a non-conductive to a conductive state, the manual operation of the pushbutton 18 to close contacts 18a and 18b, or the operation of the timer 19, will feed a condition-changing signal to a control circuit generally indicated by reference numeral 20. Each time the triac 3 is in a non-conductive state, the reception by the control circuit 20 of a signal resulting from the operation of pushbutton 18 or the timer 19 will result in a voltage (for example, a positive DC voltage) fed from circuit 20 to one input 21a of a "NAND" gate 21 whose other input 21b is fed from the output of a positive edge one shot multivibrator 22 which generates a positive pulse shown in FIG. 2(c) as the input thereto rises in a positive direction, which is near the point where the applied AC voltage has just passed through zero. When the triac is in a conductive state the reception by the control circuit 20 of a signal resulting from the operation of the pushbutton 18 or the timer 19 will result in a non-positive or zero voltage fed from circuit 20. The input of the positive edge one shot multivibrator 22 receives the output of a threshold detector 23 which senses the full wave rectified input shown in FIG. 2(a) of the applied AC input voltage from a part of the power supply and triac triggering circuit 11 to be described. The threshold detector 23 may be a Schmidt trigger circuit which has an output shown in FIG. 2(b) which rises from zero to +4 volts when the input thereto exceeds +4 volts, occurring shortly after the applied AC voltage goes through zero, as shown by comparing FIGS. 2(a) and 2(b), and which returns to zero when the applied AC voltage drops somewhat below +4 volts. The voltage across a resistor 34 is shown coupled to the input terminals 23a and 23b of the threshold detector 23 which generates a positive pulse each half cycle of the applied AC voltage as shown in FIG. 2(b). The resistor 34 is a part of a series circuit comprising the resistor 34 and a resistor 35 connected between ground and terminal 31a across which the full wave rectified waveform shown in FIG. 2(a) is applied.

Thus, the presence of a positive pulse on the input 21b of the "NAND" gate 21 and a positive DC voltage at the input 21a of this gate when a triac turn-on operation is to be achieved results in a negative going pulse on the output line 21c of the "NAND" gate 21, which pulse is fed to a switching circuit to be described. (The "NAND" gate 21 will normally have a positive output which goes to ground when both inputs thereof receive a positive voltage.) Thus in a manner to be described, each negative going pulse at the output of the "NAND" gate 21 effects the generation of a triac triggering signal across the resistor 16.

Each time the triac 3 is in a conductive mode of operation, the reception by the control circuit 20 of a condition changing signal resulting from the operation of pushbutton 18 or the timer 19 results in the disappearance of a positive gate opening voltage from the input 21a of the "NAND" gate 21, which closes the gate, resulting in the disappearance of the trigger signals across the resistor 16.

The negative going pulses at the output of "NAND" gate 21 initiated by the one shot multivibrator 22 control a parallel branch impedance circuit 31 connected in series with the energy storage capacitor 13a in the power supply and triac triggering circuit 11. The terminal 31a of the parallel branch impedance circuit 31 remote from the energy storage capacitor 13a is connected to the juncture of a pair of rectifiers D1–D2 forming part of a full wave rectifier bridge circuit. The opposite terminal of the parallel branch impedance circuit 31 is connected to the positive terminal 14 of the energy storage capacitor 13a. The rectifiers D1–D2 are respectively connected in an opposite sense and in series between rectifier bridge circuit input terminal 32 connected to the AC input conductor 6 and the terminal 17 of the rectifier bridge input circuit (which is the terminal thereof closest to the AC input conductor 6″). During successive half cycles of the applied AC voltage, the rectifiers D1–D2 couple the positive voltage alternately appearing on conductors 6 and 6″ to the parallel branch impedance circuit terminal 31a. The ground terminal 14′ of the energy storage capacitor 13a, which is the terminal thereof remote from the parallel branch impedance circuit 31, is connected to the juncture between a pair of oppositely connected rectifiers D2′–D1′ respectively connected in an opposite sense and in series between the rectifier bridge input terminals 32 and 17. The rectifier D1′, which is thus connected between ground and the terminal 17, is oriented to direct current during every other half cycle of the applied AC voltage in the same direction through the parallel branch impedance circuit 31 and energy storage capacitor 13 as the rectifier D1 coupled between the bridge circuit input terminal 32 and parallel branch impedance circuit terminal 31a, the rectifiers D2 and D2' then serving as isolating rectifiers. The rectifier D2', which is connected between ground and rectifier bridge input terminal 32, is oriented to direct current during the intervening half cycles in the same direction through the parallel branch impedance circuit 31 and energy storage capacitor 13a as the rectifier D2 connected between the terminal 17 and the terminal 31a, the rectifiers D1 and D1' then serving as isolating rectifiers.

It should be apparent that while current flows in only one direction through the parallel branch impedance circuit 31 and energy storage capacitor 13a, the current flowing through the trigger signal developing resistor 16 alternates in direction during successive half cycles of the applied AC voltage, as shown in FIG. 2(d). Also, the voltage across the juncture points of rectifier pairs D1-D2 and D1'-D2' has the full wave rectified wave form shown in FIG. 2(a), and is applied across a series circuit of resistors 32 and 34.

The parallel branch impedance circuit 31 comprises a relatively high impedance branch which preferably includes a resistor 33 having a resistance many orders greater than the resistance to the load device. For example, resistor 33 may have a value many thousands of times greater than that of the load device, so that the resistor 33 will absorb only a small fraction of the load device rated power when triac 3 is non-conductive. During a continuous non-conductive state of the triac 3, the capacitor 13a will charge through large resistor 33 to a value permitted by the breakdown voltage of the zener diode 13b, which is assumed to be about +4 volts.

Connected in parallel with resistor 33 is preferably a threshold switch device, like an SCR device 35. The anode and cathode terminals 35a and 35b thereof (sometimes referred to as load terminals) are connected across the terminals of resistor 33 so that the SCR device will conduct current in the same direction as permitted by the rectifier pairs D1-D1' and D2-D2', which conditions will charge the capacitor 13a to a positive voltage relative to chassis ground. The gate or control terminal 35c of the SCR device is connected through a resistor 39 to the positive capacitor terminal 14. A capacitor 37 is connected between the control terminal 35c and a transistor switching circuit generally indicated by reference numeral 38 and controlled by the output from the "NAND" gate 21.

The transistor switching circuit 38 includes an NPN transistor 39 with its collector 39c coupled through a resistor 40 to capacitor 37 and its emitter 39e connected to grounded terminal 14'. The base 39b of transistor 39 is connected to the juncture between the emitter 41e of a NPN control transistor 41 and one terminal of a resistor whose opposite terminal is connected to the grounded terminal 14'. The collector 41c of the transistor 41 is coupled through a resistor 45 to the positive terminal 14. The base terminal 41b of transistor 41 is connected to the normally positive output of the "NAND" gate 21. Accordingly, the transistor 41 is normally conducting, and the resulting positive voltage across the resistor 43 is coupled to the base of transistor 39 to render the same conductive, so that capacitor 37 is charged to +4 volts, the plate of the capacitor 37 nearest the SCR control terminal 35c being 4 volts positive relative to the other plate thereof. The +4 volt charge on capacitor 37 is opposed by and therefore cancelled by the +4 volt charge on energy storage capacitor 13a insofar as the SCR device control and cathode terminals 35c and 35b are concerned.

The capacitor 37 is also connected to the emitter terminal 47e of a normally non-conductive NPN transistor 47 whose collector 47c is connected to the positive terminal 14. The base 47b of the transistor 47 is connected to the juncture of the collector of transistor 41 and resistor 45. The base of transistor 47 is normally less positive than the emitter thereof so that transistor 47 is normally non-conductive. When a negative going ground pulse appears at the output of the "NAND" gate 21, NPN transistors 41 and 47 become momentarily non-conductive and transistor 47 becomes momentarily conductive, to connect the emitter of transistor 47 to the +4 volt terminal 14. The conduction of transistor 47 couples the positive voltage charge across the capacitor 37 directly between the control and cathode terminals of the SCR device 35, the capacitor 37 then discharging through these terminals to trigger the same into a conductive state. This quickly causes current to flow to the energy storage capacitor 13a, if this capacitor is not yet charged to +4 volts. In any event, either during the flow of charge to the capacitor 13a or the breakdown of the zener diode 13b, current suddenly flows through the conducting pair of rectifiers D1-D1' or D2-D2' and the trigger signal developing resistor 16, to generate a voltage pulse which triggers the triac 3 into conduction after a short delay required for triac conduction to begin. Conduction of the triac 3 then terminates the flow of current through the pair of rectifiers involved and the SCR device 35. Thus, the negative pulses appearing at the output of "NAND" gate 21 shortly after the zero crossings of the applied AC voltage result in triac triggering pulses of alternating polarity (FIG. 2d) across resistor 16, to effect the most efficient triggering of the triac.

While the values of the following impedance elements can vary widely, particularly satisfactory results were achieved when they had the following values:
 resistor 33—22,000 ohms
 capacitor 13a—1,000 microfarads
 resistor 16—2.5 ohms
 capacitor 37—0.22 microfarads
 resistors 39 and 40—totals 10,000 ohms It should be apparent that the present invention has provided an exceedingly low power draining, relatively inexpensive to manufacture and reliable power supply and control circuit including a triac or similar AC threshold device, connected in series with a load device at a situs where there is access to only one AC power line and one load device terminal. Because of the use of a branch impedance circuit 31 including a switchable preferably SCR device shunting branch thereof, a desired charge on an energy storing capacitor can be maintained in the few degrees after the applied AC voltage goes through zero, so that the triac can be triggered into conduction at such a low voltage that little or no noise interference is produced.

It should be understood that numerous modifications can be made in the most preferred form of the invention described without deviating from the broader aspects of the invention. For example, while the exemplary form of the invention has been disclosed in the drawings as controlling the operation of a triac power switch, it should be understood that the invention is also applicable to a circuit wherein the triac is replaced, for example, by an SCR or similar device connected within the rectifier bridge circuit disclosed in the drawings, so that the power switch controlling power to the load passes only DC current. In such case, the trigger pulses fed to the control or gate terminal of the SCR device are pulses of only one polarity. Such an SCR circuit was developed by Louis Schornack. A further circuit variation of Louis Schornack encompassed by the present invention utilizes a threshold triggerable AC conducting device, like a triac, instead of an SCR device, in parallel with the high impedance path of the parallel branch impedance circuit 31 to supply the low impedance path thereof. This circuit requires only one power rectifier instead of a four rectifier diode bridge circuit, as shown in the drawings.

I claim:

1. In a DC power supply and control circuit including a pair of AC input terminals to be connected across and energized from one AC power line and one conductor extending to one terminal of a load device whose other terminal is to be connected to another AC power line, said AC power lines being the source of an applied AC voltage to energize and operate the power supply and control circuit and load device, said power supply and control circuit further including a triggerable power conducting power switch having a pair of load terminals coupled to said AC input terminals and a control terminal for receiving a trigger signal which triggers said power switch into a conductive state which continues until current flow therethrough drops below a given holding current level during the half cycle of the applied AC voltage involved; and controller means for effecting operation of said power switch either in a non-conductive mode where the switch is continuously non-conductive or in a conductive mode where the switch is conductive repeatedly for a portion of the half cycles involved which begin after the beginning of the half cycles involved, said controller means during the conductive mode of operation of said switch generating a power switch triggering control signal fed to said control terminal of said power switch which signal causes conduction thereof a short time interval after the AC voltage applied to said power switch load terminals passes through zero; the improvement comprising a DC power supply circuit for energizing said controller means, said DC power supply circuit being coupled across said AC input terminals so that the circuit is shunted by said switch when the switch is conducting, said DC power supply circuit including energy storing means which is coupled to said controller means to energize the same, and a series circuit for feeding current to said energy storing means from said pair of AC input terminals, said series circuit including rectifier means for converting AC to DC and a relatively large impedance connected in series with said rectifier means and energy storing means, said impedance means being of such a greater magnitude than the impedance of said load device that only a small amount of power compared to the normal load power is drawn by said power supply circuit when said power switch is continuously non-conductive, and means operative only during the conductive mode of operation of the power switch for shunting said impedance means with a low impedance during the short intervals at the beginning of the half cycle conducting periods of the power switch when said power switch is still non-conductive so that said energy storing means is rapidly charged to permit conduction of said power switch starting at a low value of the applied AC voltage.

2. The power supply and control circuit of claim 1 wherein said means for shunting said large impedance means is a threshold device having load terminals in parallel with said large impedance means and a control terminal fed by a source of a triggering signal by said controller means at least at the beginning of at least every other half cycle of the AC voltage applied to the load terminals of said power switch when conduction of said power switch is desired.

3. The power supply and control circuit of claim 1 or 2 wherein said rectifier means is a full wave rectifier circuit coupled between said energy storage and large impedance means and said pair of AC input terminals.

4. The power supply and control circuit of claim 1 or 2 wherein said control signal generated by said controller means is developed across a relatively low impedance means connected in series between said rectifier means and one of said pair of AC input terminals, the control terminal and one of the load terminals of said power switch being coupled across the latter impedance means.

5. The power supply and control circuit of claim 1 wherein said energy storing means is a capacitor means.

6. The power supply and control circuit of claim 5 wherein a zener diode is coupled across said capacitor means.

7. The power supply and control circuit of claim 1 or 2 wherein said controller means includes a manually operable power on-off control means which generates control signals when operated, timer means including a manually operable setting means operable to timer-on and timer-off conditions, said timer means producing predetermined timed signals which are to effect operation of the power switch to conducting and non-conducting states at desired time intervals over a twenty-four hour period, said controller means including control means responsive to the signals of said manually operable power on-off control means at least when said manually operable setting means is in a timer-off condition and responsive to said timer signals generated by said timer means when said manually operable setting means is in a timer-on condition.

8. The power supply and control circuit of claim 1 which said power switch is an AC conducting device connected directly across said AC input terminals.

9. In a DC power supply and control circuit including a pair of AC input terminals connected across and energized from one AC power line and one conductor extending to one terminal of a load device whose other terminal is connected to another AC power line, said AC power lines being the source of an applied AC voltage to energize and operate the power supply and control circuit and load device, said power supply and control circuit further including a triggerable power switch having a pair of load terminals coupled to said AC input terminals and a control terminal for receiving a triggering signal which triggers said power switch into a conductive state which continues until current flow therethrough drops below a given holding current level during the half cycle of the applied AC voltage involved; the improvement comprising controller means for effecting operation of said power switch either in a non-conductive mode where the switch is continuously non-conductive or in a conductive mode where the switch is conductive repeatedly for a portion of the half cycle involved which begin after the beginning of the half cycle involved, said controller means during the conductive mode of operation of said switch generating a power switch triggering control signal fed to said control terminal of said power switch which signal causes conduction thereof a short time interval after the AC voltage applied to said power switch load terminals passes through zero; a DC power supply circuit for energizing said controller means, said DC power supply circuit being coupled across said AC input terminals so that the circuit is shunted by said switch when the switch is conducting, said DC power supply circuit comprising a parallel branch impedance circuit connected in series with an energy storing means which supplies energizing DC to said controller means and rectifier means between said AC input terminals, said rectifier means limiting current flow in one direction through said energy storing means, said parallel branch impedance circuit comprising a relatively large impedance of such a greater magnitude than the impedance of said load device that only a small amount of power compared to the normal load power is drawn by said energy storing means when said power switch is continuously non-conductive, said parallel branch impedance circuit having a normally non-conducting branch in parallel with said relatively large impedance and switchable into a highly conductive relatively low impedance state to effect the rapid feeding of current to said energy storing means; and said controller means including means operative only during the conductive mode of operation of the power switch for switching said normally non-conductive branch to said highly conductive state at or shortly after the instantaneous value of the AC voltage present across said AC input terminals passes through zero and before said power switch can be triggered into conduction so that said energizing storage means is rapidly charged to permit conduction of said power switch starting at a low value of the applied AC voltage.

10. The DC power supply and control circuit of claim 9 wherein said normally non-conducting branch of said normally parallel branch impedance circuit is a threshold device having load terminals in parallel with said high impedance branch and a control terminal fed by a source of a triggering signal generated near the beginning of at least every other half cycle of the AC voltage across said AC input terminals when conduction of said power switch is desired.

11. The DC power supply and control circuit of claim 10 wherein there is provided a relatively low triggering signal developing impedance means in series with said rectifier means, parallel branch impedance circuit and energy storage means, said control terminal and one of said load terminals of said AC conduction power switch being coupled across said triggering signal developing impedance means.

12. The DC power supply and control circuit of claim 9 wherein said power switch is an AC conducting device connected directly across said AC input terminals.

13. The DC power supply and control circuit of claim 12 wherein said rectifier means is a full wave rectifier bridge circuit, and said triggering signal developing impedance means is coupled between said full wave rectifier circuit and one of said AC input terminals, so that the polarity of the triggering signal developed across said triggering signal developing impedance means alternates in polarity during successive half cycles of the applied AC voltage.

14. The DC power supply and control circuit of claim 10 wherein said source of a triggering signal for said threshold device includes charging impedance means connected between the control terminal of said threshold device and the juncture of said parallel branch impedance circuit and energy storage means, capacitor means and a switching circuit connected in series between said control terminal of said threshold device and the terminal of said energy storage means remote from said parallel branch impedance circuit, said switching circuit having a first switching section for connecting said capacitor means to said remote terminal of said energy storage means, a second switching section for connecting said capacitor means to said point of juncture, means for normally closing said first switching section so that said capacitor means charges to the voltage across said energy storage means, and means for opening said first switching section while closing said second switching section to discharge said capacitor means into said control terminal of said threshold device at the beginning of each half cycle it is desired said threshold device is to become conductive.

15. The power supply and control circuit of claim 9 wherein said rectifier means is a full wave rectifier circuit comprising a first pair of rectifiers oppositely connected between said AC input terminals, a second pair of rectifiers coupled in series in an opposite sense from said first pair of rectifiers between said AC input terminals, said parallel branch impedance circuit and said energy storage means being connected in series between the junctures of said first and second pair of rectifiers so that current flows from said pair of rectifiers in the same direction through said series circuit during successive half cycles of the applied AC voltage.

16. The power supply and control circuit of claim 9 or 10 wherein said source of a triggering signal includes manually operable power on-off control means which generates power switch mode changing control signals when operated, timer means including a manually operable setting means operable to timer-on and timer-off conditions, said timer means producing predetermined timed power switch mode changing control signals at desired time intervals over a twenty-four hour period, and control means responsive to the signals of said manually operable power on-off control means at least when said manually operable setting means is in a timer-off condition and responsive to said timer signals generated by said timer means when said manually operable setting means is in a timer-on condition for producing said triggering signals during every other power switch changing control signal generated by said manually operable power on-off control means or timer means.

17. A DC power supply and control circuit comprising: a pair of AC input terminals to be connected across and energized from one AC power line and one conductor extending to one terminal of a load device whose other terminal is to be connected to another AC power line; a triggerable power threshold switch having a pair of load terminals coupled to said AC input terminals and a control terminal for receiving a trigger signal which triggers said power switch into a conductive state which continues until current flow therethrough drops below a given holding current level during a half cycle of the applied AC voltage involved; control means for selectively providing or terminating a control signal which is to initiate a conductive mode of operation of said power threshold switch; a DC power supply circuit for said control means for energizing the same, said DC power supply circuit being coupled across said AC input terminals so that the circuit is shunted by said switch when the switch is conducting, said DC power supply circuit including a chargeable energy storing means having output terminals at which appears the DC voltage to which the storing means charges, said output terminals being coupled to said control means to energize the same, a circuit for feeding charging current to said energy storing means from said pair of AC input terminals, said circuit including rectifier means for converting AC to DC and a relatively large impedance means connected in series with said rectifier means and energy storing means and through which said energy storing means charges when said power threshold switch is operated in a non-conductive mode, shunting means for providing a low impedance during short intervals at the beginning of the half cycle conducting periods of the power threshold switch operating in a conductive mode before the switch is triggered into conduction, said shunting means being a threshold device having load terminals in parallel with said large impedance means and a control terminal, and switch means selectively operable by said control means to feed a triggering signal to the control terminal of said shunting threshold device at least at or near the beginning of each half cycle of the applied AC voltage when the power threshold switch is to be operated in its conductive mode; and power switch triggering means following the conduction of said shunting threshold device each such half cycle for generating a triggering signal fed to the control terminal of said power threshold switch to trigger the same into conduction each such half cycle shortly after said shunting threshold device becomes conducting, said energy storing means then being charged by current flowing through the shunting threshold device prior to the initiation of conduction of said power threshold switch every such half cycle of the applied AC voltage so that said energizing storage means is rapidly charged to permit conduction of said power switch starting at a low value of the applied AC voltage.

* * * * *